United States Patent
Morales et al.

(10) Patent No.: US 7,465,419 B1
(45) Date of Patent: Dec. 16, 2008

(54) METHOD FOR PROVIDING A COMPLIANT CANTILEVERED MICROMOLD

(75) Inventors: Alfredo M. Morales, Livermore, CA (US); Linda A. Domeier, Danville, CA (US); Marcela G. Gonzales, Shoreline, WA (US); Patrick N. Keifer, Livermore, CA (US); Terry J. Garino, Albuquerque, NM (US)

(73) Assignee: Sandia Corporation, Livermore, CA (US)

( * ) Notice: Subject to any disclaimer, the term of this patent is extended or adjusted under 35 U.S.C. 154(b) by 469 days.

(21) Appl. No.: 11/440,867

(22) Filed: May 24, 2006

Related U.S. Application Data (60) Division of application No. 10/222,763, filed on Aug. 15, 2002, now Pat. No. 7,090,189, which is a continuation-in-part of application No. 10/052,948, filed on Jan. 17, 2002, now Pat. No. 6,679,471, which is a continuation-in-part of application No. 09/765,078, filed on Jan. 17, 2001, now Pat. No. 6,422,528.

(51) Int. Cl.
*B29C 33/00* (2006.01)

(52) U.S. Cl. .................... 264/219; 264/279; 264/279.1

(58) Field of Classification Search .............. 249/127, 249/134, 135; 205/67, 70, 112; 264/320, 264/219, 279, 279.1; 204/4
See application file for complete search history.

(56) References Cited

U.S. PATENT DOCUMENTS 5,073,237 A * 12/1991 Bacher et al. ............... 264/320

* cited by examiner

*Primary Examiner*—Christina Johnson
*Assistant Examiner*—Larry Thrower
(74) *Attorney, Agent, or Firm*—Timothy P. Evans (57) ABSTRACT

A compliant cantilevered three-dimensional micromold is provided. The compliant cantilevered micromold is suitable for use in the replication of cantilevered microparts and greatly simplifies the replication of such cantilevered parts. The compliant cantilevered micromold may be used to fabricate microparts using casting or electroforming techniques. When the compliant micromold is used to fabricate electroformed cantilevered parts, the micromold will also comprise an electrically conducting base formed by a porous metal substrate that is embedded within the compliant cantilevered micromold. Methods for fabricating the compliant cantilevered micromold as well as methods of replicating cantilevered microparts using the compliant cantilevered micromold are also provided.

7 Claims, 7 Drawing Sheets

METHOD FOR PROVIDING A COMPLIANT CANTILEVERED MICROMOLD

CROSS-REFERENCE TO RELATED APPLICATIONS

This application is a divisional application of prior U.S. patent application Ser. No. 10/222,763 originally filed Aug. 15, 2002 now U.S. Pat. No. 7,090,189 entitled "COMPLIANT CANTILEVERED MICROMOLD", which is a continuation-in-part of U.S. patent application Ser. No. 10/052,948, filed Jan. 17, 2002, which issued on Jan. 20, 2004, as U.S. Pat. No. 6,679,471, which is a continuation-in-part of U.S. patent application Ser. No. 09/765,078, filed Jan. 17, 2001, which issued on Jul. 23, 2002, as U.S. Pat. No. 6,422,528, the disclosures of which are incorporated by reference herein.

ACKNOWLEDGEMENT OF GOVERNMENT SUPPORT

The United States Government has rights in this invention pursuant to Contract No. DE-AC04-94AL85000 between the United States Department of Energy and Sandia Corporation for the operation of Sandia National Laboratories.

TECHNICAL FIELD

The present invention relates to the replication of cantilevered microscale parts. More specifically, it relates to the production of compliant molds with cantilevered features. Such molds enable the efficient replication of cantilevered microscale parts in a range of materials.

BACKGROUND

Micromechanical systems (commonly referred to as "MEMS") include, for example, microsensors, microactuators, microinstruments, microoptics, and the like. Many MEMS fabrication processes exist, which include silicon lithographic and etching technologies (silicon MEMS) and non-silicon based lithographic technologies such as LIGA as well as other micro-machining processes which all provide a range of part sizes and materials. All these micro-fabrication technologies can be used to directly produce the desired microparts or to produce masters or molds for replication via other processes. Replication is often desirable to provide a faster and more economical production rate.

Unfortunately, there is no currently known way to easily and economically replicate cantilevered multilevel microparts. Such microparts are difficult to replicate as they contain features that overhang recessed areas within the part. When trying to create or use a replication mold for such microparts, the recessed areas may mechanically lock the master or the replicated parts inside the mold. Replication of larger cantilevered designs, as in many commercial injection molded items, often involves the use of specialized molds which can be partially disassembled or split to allow removal of the replicated part or the use of retractable, angled or collapsible cores. These technologies are clearly more difficult to implement in the replication of microscale parts.

Standard micro-fabrication processes and simple plastic replication processes can only fabricate microparts that are essentially extrusions of two-dimensional designs. In other words, current micropart replication techniques produce prismatic microparts. In order to fabricate a cantilevered micropart, prismatic components are often microfabricated separately and then glued or diffusion-bonded together in the proper configuration. U.S. Pat. Nos. 5,735,985 and 5,793,519 to Ghosh et al., disclose the use of poly(dimethylsiloxane) molds to fabricate such prismatic ceramic microparts. In the method of Ghosh et al., however, cantilevered portions must be molded separately and then joined prior to sintering. Such post-fabrication assembly raises the cost of the device considerably.

Other attempts at manufacturing cantilevered multilayered microstructures, such as those discussed in U.S. Pat. No. 5,378,583 to Guckel et al., involve repetitive bonding and exposure of PMMA resist layers in a LIGA process. LIGA involves the deposition of a relatively thick layer of an x-ray resist on a conductive substrate, e.g., metallized silicon, followed by exposure to high-energy x-ray radiation through an x-ray mask, and then removal of the irradiated resist portions using a chemical developer. The mold so provided can be used to prepare structures having horizontal dimensions (i.e., diameters or widths) on the order of micrometers. The PMMA mold with its conducting base is then used to prepare metallic microcomponents by electroplating in the cavities (i.e., the developed regions) of the LIGA mold. See, for example, U.S. Pat. Nos. 5,190,637 and 5,576,147 to Guckel et al., and Becker et al., (1986), "Fabrication of microstructures with high aspect ratios and great structural heights by synchrotron radiation lithography, galvanoforming, and plastic molding (LIGA Process)," *Microelectronic Engineering* 1(1):35-36.

While the methods disclosed by Guckel et al., for forming cantilevered parts are suitable for fabricating individual batches of parts in a repetitive, multi-step process, those methods do not provide for either the fabrication or use of molds which can be used to replicate cantilevered microparts. There exists, therefore, a need for a quick and efficient way to fabricate cantilevered micromolds and to replicate cantilevered microparts, without the need for extensive post-fabrication assembly.

SUMMARY

It is an object of the present invention to provide a compliant cantilevered micromold comprised of a compliant polymeric material having cantilevered microscale features formed therein that can be easily fabricated and used in the replication of cantilevered microparts.

It is another object of the invention to provide a method for fabricating a compliant cantilevered micromold comprising the steps of infusing a compliant polymeric material into a patterned surface of a tooled master part having cantilevered features so as to conform to those cantilevered features, resulting in microscale cantilevered features formed from the compliant polymeric material. The infused compliant polymeric material is then hardened or polymerized and the tooled master part separated from the hardened or polymerized compliant polymeric material to provide the compliant cantilevered micromold.

It is still a further object of the invention to provide a method for making a compliant cantilevered micromold comprising a compliant polymeric material having cantilevered microscale features formed therein and also having an electrically conducting backing that can be easily fabricated and used in the replication of cantilevered electroformed, microparts.

It is yet another object of the invention to provide a method for fabricating a cantilevered micropart by electroplating the above described cantilevered micromold having an electrically conducting backing thereby filing the compliant cantilevered micromold with electroformed metal and forming the electroformed cantilevered micropart.

In one embodiment, the invention provides a cantilevered micromold comprised of a compliant polymeric material that has cantilevered microscale features formed therein. The mold is the product of the infusion of a thermoplastic or curable compliant polymeric material into the cantilevered features of a microscale master part. Upon demolding of the hardened or polymerized compliant polymeric material, a negative or reversed impression of the cantilevered features of the master part is replicated in the demolded compliant polymeric material. This resultant plastic structure, in turn, provides a cantilevered micromold that can be used to replicate the cantilevered features of the original master.

In another embodiment of the invention, the compliant micromold is itself infused with a thermoplastic or thermoset resin that is not required to be compliant. Upon demolding of the hardened or cured polymeric replicate from the compliant mold a micropart with features identical to the original master is obtained.

In another embodiment of the invention, the compliant micromold is itself infused with a slurry or paste of metal or ceramic powder plus appropriate binders and other processing aids. The powder formulation can be further processed to remove or cure the binder and sinter the metal or ceramic powder to form a replicate micropart with features identical to the original master. This additional processing can optionally occur either before or after removal of the cast powder from the compliant micromold.

In another embodiment of the invention, a cantilevered mold having an electrically conducting backing is provided, wherein the mold is produced by the infusion of a thermoplastic or curable compliant polymeric material through a porous metal substrate (sheet, screen, mesh, or foam) and into the features of a microscale master part that supports or contacts the porous metal substrate. The presence of such an electroplatable backing allows for the manufacture of electroplated cantilevered microparts. Upon demolding, the porous metal substrate will be embedded within the surface of the hardened or polymerized compliant polymeric material, and the surface of the porous metal substrate will project a compliant structure with cantilevered features determined by the master part. As was the case with the previous embodiment, this molded structure, in turn, will provide a cantilevered micromold that can be used to replicate the cantilevered features of the original master part. In particular, the porous metal substrate to which the plastic mold is mechanically bonded will provide a conducting support suitable for electroplating processes.

In another embodiment of the invention, a compliant micromold, as described above, having an electrically conductive backing is infused with an electroformed metal. After electroplating, the plated metal can be lapped and polished, and the compliant polymeric material can be removed to leave the replicated metal structure bonded to the metal substrate. If desired, machining and polishing processes can be used to remove the metal substrate from the electroformed metal microparts.

Alternatively, the electroformed microparts may be debonded from the metal substrate by using different metals as the substrate and electroforming materials, respectively, followed by selective dissolution of the substrate metal. In another variation, an appropriate metal coating or strike might be deposited on the porous metal substrate, either before or after infusing the compliant polymeric material to form the sacrificial plastic mold. That metal strike might then be selectively dissolved to release the electroformed metal parts.

Both casting and injection-molding processes may be used to infuse the compliant polymeric material through the porous metal substrate, if present, and into the contacting master part to form the compliant micromold. Both the extent to which the features are cantilevered and the tear resistance of the compliant material during demolding will dictate what processes and materials are suitable for a specific application. The injection-molding processes used to infuse the thermoplastic material through the porous metal substrate and into the contacting master part are discussed in commonly assigned U.S. Pat. No. 6,422,528. Casting processes used to infuse a castable polymeric compositions into a contacting master part are discussed in U.S. Pat. No. 6,679,471. The arrangement of the porous metal substrate, the master part, and the infused molding composition will vary according to the process used. In any such process, it is commonly desirable to carry out the infusion of the molding composition and feature replication under vacuum to avoid air entrapment and loss of fidelity in the replicated features.

Additional objects, advantages, and novel features of the invention will be set forth in part in the description that follows, and in part will become apparent to those skilled in the art upon examination of the following, or may be learned by practice of the invention.

DETAILED DESCRIPTION OF EMBODIMENTS OF THE INVENTION

Definitions and Nomenclature

Before describing the present invention in detail, it is to be understood that unless otherwise indicated this invention is not limited to specific compliant polymeric materials, porous metal substrates, patterning methods, or the like, as such may vary.

It is noted that, as used in this specification and the appended claims, the singular forms "a," "an," and "the" include plural referents unless the context clearly dictates otherwise. Thus, for example, reference to "a compliant polymeric material" includes mixtures of compliant polymeric materials, reference to "a porous metal substrate" includes reference to two or more porous metal substrates, reference to "a microscale feature" includes multiple microscale features, and the like.

The term "ceramic material" is used to refer to material that contains ceramic or is wholly ceramic in nature, wherein the term "ceramic" is used in its conventional sense to indicate a nonmetallic, inorganic material such as a metal oxide. The term "ceramic materials" as used herein encompasses composites, containing both ceramic and non-ceramic material, as well as materials that are entirely ceramic and do not contain any non-ceramic material.

The term "metallic material" is used to refer to material that is wholly or partially metallic in nature. Thus, the term "metallic materials" as used herein encompasses alloys and composites, containing both metallic and non-metallic material (such as metal oxides), as well as materials that are entirely metallic and do not contain any non-metallic material.

The term "polymer" is used herein in its conventional sense to refer to a compound having multiple monomer units, and is intended to encompass both thermoplastic and thermoset (curable or castable) polymers. Thermoplastic polymers include homopolymers as well as copolymers, including, for example, graft copolymers. Those polymers herein that are referred to as thermoset or curable are capable of becoming crosslinked, either thermally, chemically, or using light.

The term "porous," as in a "porous substrate" or a "substrate having a porous surface," refers to a substrate or surface, respectively, having a porosity (void percentage) in the range of about 1% to about 99%, preferably about 5% to about 99%, and more preferably in the range of about 15% to about 95%.

The terms "micropart," "microstructure," and "microcomponent", are used interchangeably herein to refer to a three-dimensional solid structure whose height, width (or diameter), or length is less than about 100 micrometers, i.e., at least one dimension of the three-dimensional structure is less than about 100 micrometers. The term "microscale" is intended to describe the dimensions of a "micropart," a "microstructure," or a "microcomponents" or to be used in reference thereto; and the term "microfeature" is used to refer to a feature disposed on, contained in or otherwise associated with a "micropart," a "microstructure," or a "microcomponent."

The terms electroplating and electroforming are used interchangeably herein to refer to the process of building up metals or alloys by electrochemically reducing a metal salt or salts.

The terms electroplated and electroformed are used interchangeably herein to refer to the metals or alloys produced by electrochemically reducing a metal salt or salts.

The Compliant Cantilevered Micromold:

It has been discovered that cantilevered micromolds suitable for use in the replication of microparts having cantilevered features can be fabricated using a compliant polymeric material. The use of such a compliant polymeric material allows for the removal of the micromold from a part master without damage to the cantilevered structures formed therein. The compliant cantilevered micromold may be fabricated from any compliant polymeric material, e.g., a thermoplastic or curable polymer having a tear strength high enough to insure that the micromold may successfully release the cantilevered features in the master part without incurring damage. The level of tear strength required will clearly depend on the extent to which the features are cantilevered and the demolding process conditions such as speed and temperature.

Suitable compliant polymeric materials are thermoplastic or thermoset polymeric compositions that are in a rubbery state at ambient temperatures (i.e., have a glass transition, Tg, below room temperature). The hardness or modulus of such materials varies widely according to the specific ingredients used and can therefore be adjusted to provide the needed level of compliance. Such compliant polymeric materials include, but are not limited to cast elastomers such as polysiloxanes, polyalkylenes, polyurethanes, epoxies, and rubbery acrylics (such as ethylhexyl acrylate) or commercial thermoplastic elastomers based on a wide range of copolymer and polymer blend technologies, moldable rubbers such as butyl and ethylene propylene diene monomer (EPDM) and others, and other polymers having sufficient compliance and lubricity to release the microparts formed using the micromold. These might include polyolefins such as polyethylene or other plastics with a glass transition only slightly above room temperature and which become rubbery with slight heating. Particularly preferred compliant polymeric materials are polysiloxanes, especially poly(dimethylsiloxane), and polyurethanes. Polyurethanes, like many castable thermosets, can be individually formulated from a wide range of commercially available polyisocyanate, polyol and other components or can be obtained as commercial kits that contain matched components. Examples of such kits would include Yantico TDT-178-85 or the Conap EN series of elastomers.

In order to increase or modify the compliant properties of the compliant polymeric material, fillers may also be incorporated into the material to improve the tear strength. When present, the filler generally represent from approximately 1 wt % to approximately 50 wt % of the compliant composition. More typically, the filler will represent from approximately 10 wt. % to approximately 30 wt. % of the compliant composition. Suitable filler materials include, but are not limited to, silica, carbon black, and talc, and will be well known to one of skill in the art. Commercially available filled silicones, such as that sold under the tradename GE RTV TM630 (GE Silicones, a division of General Electric Company, Fairfield, Conn.), may be used, or the filler may be added to other compliant polymeric materials as needed.

Figure 1A:
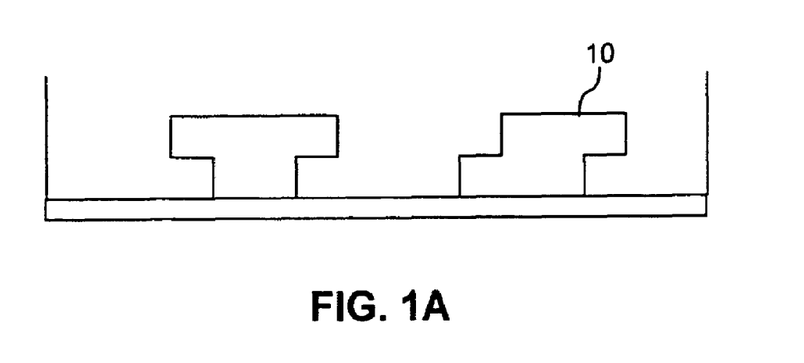
FIG. 1A schematically illustrates a cantilevered master part.
Figure 1B:
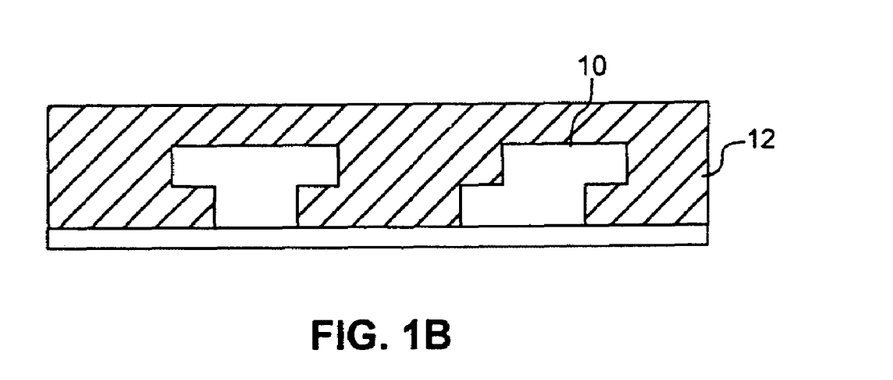
FIG. 1B schematically illustrates the compliant polymeric material infused into the features of the master part.
Figure 1C:
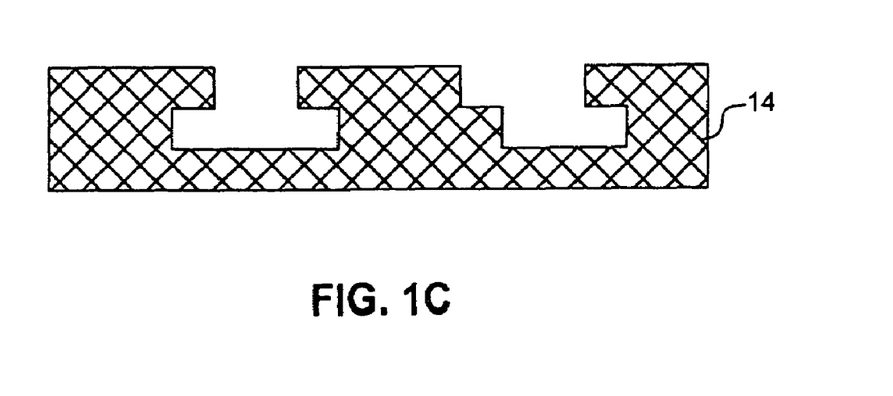
FIG. 1C schematically illustrates the compliant cantilevered micromold formed when the master part is removed from the hardened or polymerized compliant polymeric material.

Compliant Micromold Fabrication:

FIGS. 1A-1C illustrate one embodiment of the present invention, wherein a castable compliant polymeric material is used to form a compliant micromold. The compliant polymeric material is infused into a master part and then hardened or polymerized to form a cantilevered micromold. FIG. 1A shows a master part 10 having three-dimensional cantilevered features.

The master part may be fabricated, for example, using the LIGA process or the like to form single-layered structures that are then glued or spot-welded together to form cantilevered structures. Alternatively, continuous multilevel cantilevered LIGA microstructures of micrometer or submicrometer dimensions may be formed using a conductive polymeric material, as described in U.S. Pat. No. 6,458,263 to Morales, et al. In this method, cantilevered microstructures are formed layer by layer using a conductive polymer layer to cover the previous layers and to act as an electroforming base for the formation of each layer. The master part may contain multiple levels of features patterned therein.

In FIG. 1B, the curable compliant polymeric material 12 is infused into the features of cantilevered master part 10. The castable compliant polymeric material is then hardened or polymerized to form a compliant cantilevered micromold 14. As shown in FIG. 1C, after the cantilevered master part 10 is removed, the desired compliant cantilevered micromold 14 remains and contains cavities suitable for replicating the features of the cantilevered master part 10.

Figure 2A:
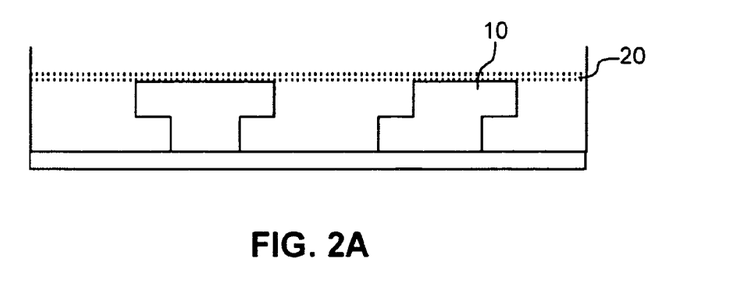
FIG. 2A schematically illustrates a porous metal substrate, in this case a perforated metal screen, in contact with a master part having cantilevered features.
Figure 2B:
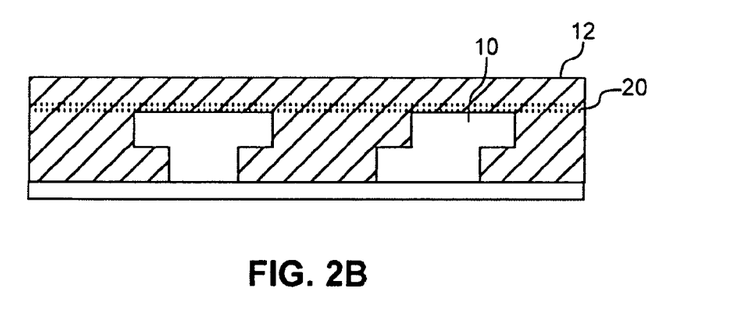
FIG. 2B schematically illustrates a castable compliant polymeric material infused through the pores or perforations of the porous metal substrate, filling the features of the master part.
Figure 2C:
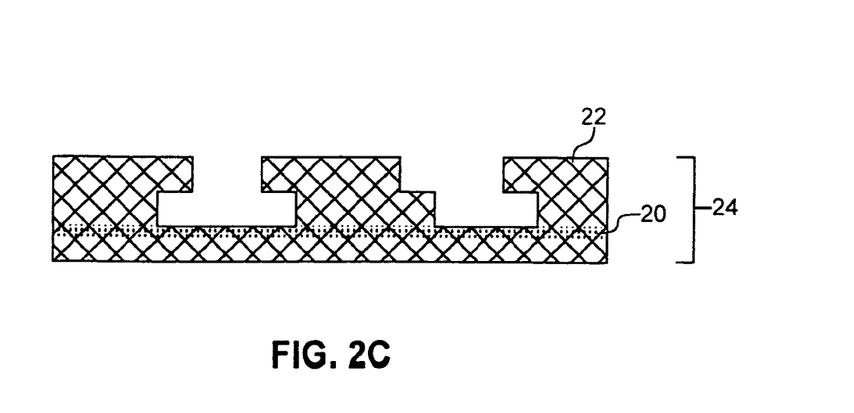
FIG. 2C schematically illustrates the cast mold and the perforated metal bonded together after the master part has been removed, thereby providing the compliant cantilevered micromold.

FIGS. 2A-2C illustrate another embodiment of the present invention that utilizes a curable compliant polymeric material to form sacrificial plastic molds that are capable of replicating electroformed metal structures. FIG. 2A shows a porous metal substrate 20; in this case, a perforated metal screen is in contact with a cantilevered master part 10, as discussed above. In FIG. 2B, the curable compliant polymeric material 12 is infused through the pores or perforations in the porous metal substrate 20, thereby filling the features of the cantilevered master part 10. The curable compliant polymeric material 12 is then hardened or polymerized to form a cured compliant cantilevered mold 22. As shown in FIG. 2C, after the cantilevered master part 10 is removed, the cured compliant cantilevered mold 22 and the porous metal substrate 20 remain together and provide the desired electroplatable compliant cantilevered micromold 24.

Figure 3A:
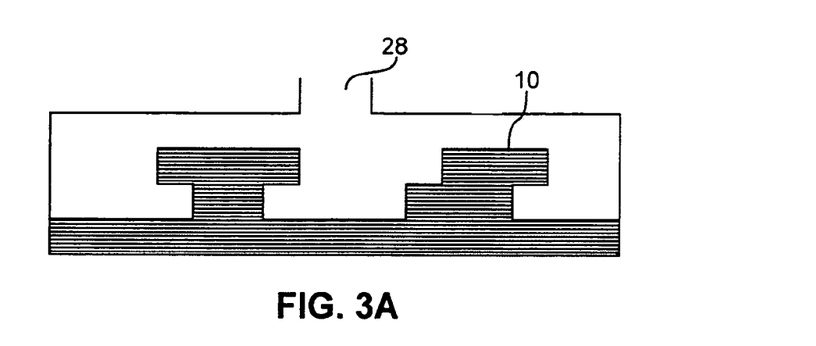
FIG. 3A schematically illustrates a cantilevered master part placed in an injection-molding cavity.
Figure 3B:
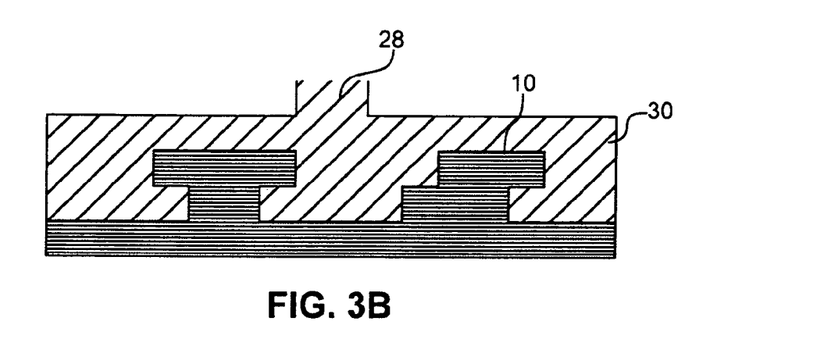
FIG. 3B schematically illustrates the injection-molding cavity filled with a selected thermoplastic or castable compliant material.
Figure 3C:
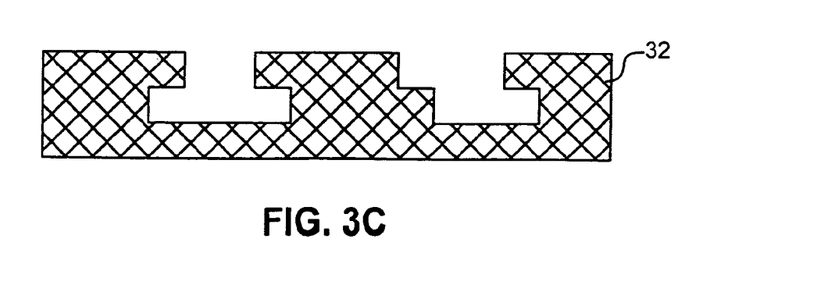
FIG. 3C schematically illustrates the resulting compliant cantilevered micromold consisting of the hardened or polymerized compliant thermoplastic or curable material after their removal from the mold cavity, thereby forming the compliant cantilevered micromold.

FIGS. 3A-3C illustrate another embodiment of the present invention that uses injection molding of a compliant thermoplastic material or reaction injection molding of a curable compliant polymeric material to form a compliant cantilevered micromold. As shown in FIG. 3A, cantilevered master part 10 forms the tooling within an injection-molding cavity 28. A molten compliant thermoplastic material 30 is then injected into the cantilevered features of the cantilevered master part 10, as shown in FIG. 3B. Once the infused compliant thermoplastic material is sufficiently cooled, the cooled compliant thermoplastic material 32 is removed from the injection molding cavity 28 as shown in FIG. 3C, thereby providing the compliant cantilevered micromold.

Figure 4A:
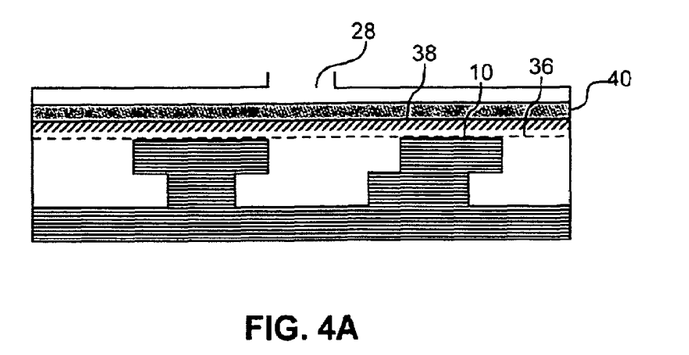
FIG. 4A schematically illustrates a perforated metal sheet, a ridged plate, and a soft, porous metal mesh stacked within an injection-molding or reaction injection molding cavity on top of a cantilevered master part that has cantilevered features.
Figure 4B:
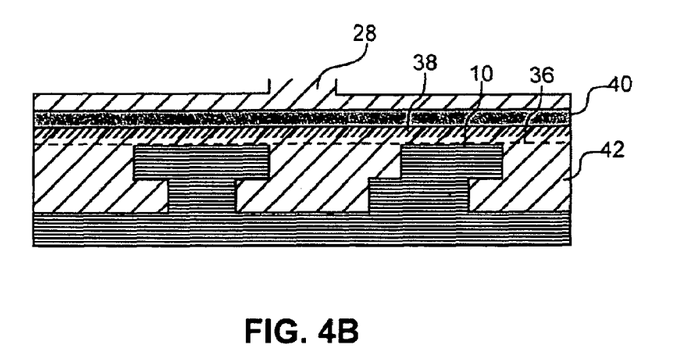
FIG. 4B schematically illustrates molten compliant material infused through both the ridged plate and the porous metal substrates into the cantilevered features of the cantilevered master part.
Figure 4C:
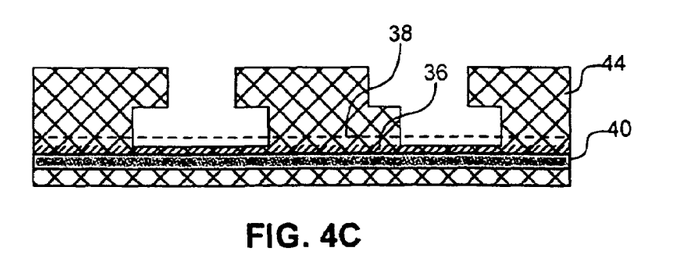
FIG. 4C schematically illustrates the injected compliant material, ridged plate and porous metals after their removal from the mold cavity, thereby forming the compliant cantilevered micromold.

FIGS. 4A-4C illustrate another embodiment of the present invention, which uses injection-molding of the thermoplastic compliant polymeric material or reaction injection molding of a curable compliant polymeric material in combination with one or more porous metal substrates placed within the injection-molding cavity. As shown in FIG. 4A, both a perforated metal sheet 36 and a soft, porous metal mesh 38 and a rigid plate 40 with large holes or channels to direct the thermoplastic compliant polymeric material flow are stacked on top of a cantilevered master part 10 which forms the tooling within an injection-molding cavity 28. This type of injection molding process, which uses free porous metal substrates in the mold cavity, is facilitated by a vertical arrangement of the injection-molding machine, but horizontal arrangements are possible. Upon injection, the molten compliant polymeric material 42 is infused through the porous metal substrates 36 and 38 as well as the rigid plate 40 and into the features of the master part 10, as shown in FIG. 4B. Once the compliant thermoplastic material is sufficiently cooled, the cooled injected compliant polymeric material 44 and porous metals 36 and 38 and 40 are removed from the mold cavity 28 as shown in FIG. 4C, thereby providing the compliant cantilevered micromold with an electrically conducting backing.

When an electroforming micromold is to be fabricated, such as those described in FIGS. 2A-2C and 4A-4C, more than one porous metal substrate, such as the combination of perforated sheet and metal mesh or foam and rigid plate described in FIGS. 4A-4C, may be incorporated into the cantilevered micromold. Also, a rigid metal mesh or other porous metal may replace the perforated metal screen in the above described embodiments. The use of the softer high porosity mesh is also optional, and is meant to insure that the rigid mesh or screen does not move away from the tooled cavity face during injection of the castable or thermoplastic compliant polymeric material. The rigid plate with macroporous holes or channels is also desirable to help maintain planarity in the cantilevered micromold after it is removed from the molding cavity and continues to cool.

A variety of porous metal materials suitable for use in the processes embodied above and include metal meshes, sintered metal meshes, perforated metal screens, etched metal screens, metal foams, metal felts, and metal mats. The porous metal materials may be any metallic material selected from the group consisting of Cu, Ni, Ti, Al, Ag, Au, Pt, stainless steel, and combinations thereof. Many suitable porous metal materials are available commercially. For example, Mott Industrial (division of Mott Corporation, Farmington, Conn.) manufactures a range of hard sintered meshes widely used in filtering and sparging applications. These are available in a range of metals (including stainless steel, Monel®, nickel, Hastelloy®, Inconel®, titanium, silver, gold, and platinum) that are sintered into a variety of shapes with average pore sizes of 0.2, 0.5, 1, 2, 5, 10, 20, 40, and 100 micrometers. Technetics Corporation, DeLand, Fla., manufactures porous metal felts from various alloys using 10-150 micrometer fibers and 35-90% pore volumes. Buckbee-Mears St. Paul (division of BMC Industries, Inc., Minneapolis, Minn.) manufactures microetched metal screens having holes in a wide range of sizes (down to 75 microns in diameter) and spatial arrangements. Inco Limited, Toronto, Canada, manufactures highly porous and compressible foams from nickel.

Any of these porous metal substrates may be modified by the application of a thin metal coating or strike suitable for later dissolution. Such a coating may be applied by electroplating techniques or by other metal coating techniques known in the art. While coatings of many metals may easily be applied, copper is most commonly used for nickel-electroformed parts, due to its selective etching behavior.

Figure 5A:
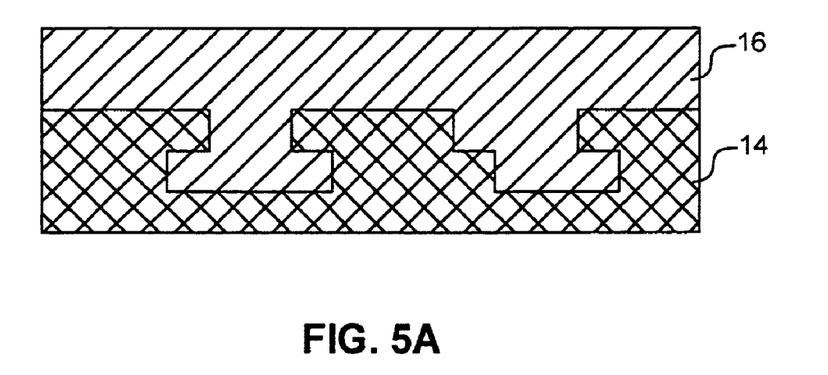
FIG. 5A schematically illustrates a compliant cantilevered micromold filled with a selected thermoplastic or castable material.
Figure 5B:
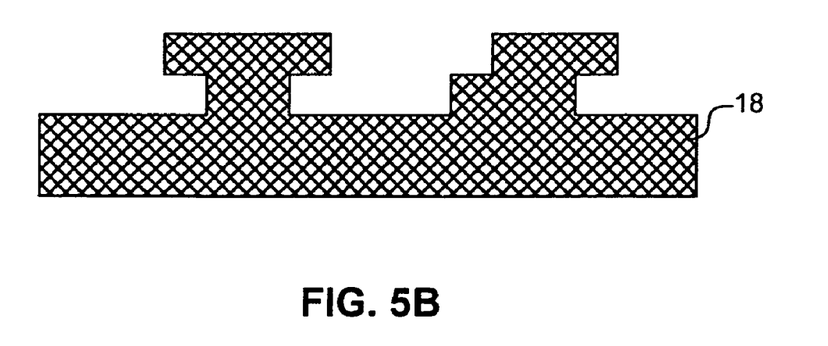
FIG. 5B schematically illustrates the resulting cantilevered structure consisting of the hardened or polymerized thermoplastic or curable material after the compliant cantilevered micromold is removed.

Use of the Compliant Cantilevered Micromold in Cantilevered Micropart Fabrication:

Once fabricated, the compliant cantilevered micromold may be used to replicate a cantilevered micropart using a casting or electroforming process. In one embodiment, as shown in FIG. 5A, a cantilevered micromold 14 may be filled with a selected curable molding composition 16. After polymerization of the curable molding composition, the compliant micromold is removed, either by flexing the compliant mold or by dissolution or charring of the compliant polymeric material. The resulting cantilevered structure 18, which consists of the polymerized curable molding composition, as shown in FIG. 5B, remains after the cantilevered micromold is removed. When the curable material 16 contains a ceramic or metallic filler, as will be discussed below, the resulting cantilevered structure 18 may be pyrolyzed to produce a sintered micropart.

Suitable curable molding compositions may be comprised of a variety of materials that may be hardened or polymerized after infusion into the compliant cantilevered micromold. Such curable materials are well known in the art and include thermally curable polymers, chemically curable polymers, and light curable polymers. If a thermally curable polymer is used, the temperature to which the polymer composition is heated during molding is kept to the minimum necessary to bring about cure, so as to avoid distortion of the compliant cantilevered micromold. Also, the curable material used should be chosen so that to it does not react with the compliant polymeric material of the mold or induce swelling of the compliant polymeric material.

Curable molding compositions may comprise materials selected from the group consisting of vinyl monomers, acrylic monomers, silicon-containing monomers and oligomers, epoxy resins and hardeners, polyurethane precursors, and polymers, copolymers and blends thereof. Materials selected from the group consisting of diallyl phthalates, maleimides, acetylene-terminated monomers, styrene, divinyl benzene, and modified styrene monomers are also suitable. The total range of castable and curable thermoset polymers that may be suitable for use with the compliant cantilevered molds will be appreciated by those skilled in the art and are generally described in polymeric texts and handbooks. Additional curable and castable thermoset polymers are disclosed in commonly assigned U.S. Pat. Nos. 6,679,471, and 6,422,528.

Suitable additives that may be incorporated into thermoplastic or curable materials include, but are not limited to, internal mold release agents, antioxidants, light and UV stabilizers, flow modifiers, antistatic modifiers, plasticizers, brighteners, and others. Suitable fillers include, but are not limited to, inorganic fillers (such as calcium carbonate, clays, and metal oxides), polymeric fillers (such as TEFLON® powder), pigments and dyes, and silicas. If a curable composition is used, the molding composition may also include curing agents, cure accelerators, or cure inhibitors. Such additives are well know in the art and will be readily known to a practitioner in the field.

Ceramic and metallic fillers may also be incorporated as the major component into the curable polymeric materials. Once molding is complete, the resulting ceramic or metallic green micropart may then be pyrolyzed to remove the organic components of the molding composition, followed by high temperature sintering to leave behind a densified ceramic or metallic cantilevered micropart. When ceramic or metallic nanoparticles are incorporated in the curable polymeric material, the polymerized component of the curable polymeric material must be strong enough to enable the cured green micropart to survive demolding.

Methods of forming ceramic microparts using ceramic nanoparticles are disclosed in commonly assigned U.S. Pat. No. 6,245,849 to Morales et al., entitled "Fabrication of Ceramic Microstructures from Polymer Compositions Containing Ceramic Nanaoparticles" Methods of forming sintered metallic microstructures using metallic nanoparticles are discussed in commonly assigned U.S. Pat. No. 6,472,459, entitled "Fabrication of Metallic Microstructures by Micromolding Nanoparticles."

When present as the major component and the precursor to a final ceramic or metal part, the ceramic or metallic nanoparticles generally represent on the order of 50 wt. % to 99 wt. % of the molding composition, preferably about 70 wt. % to 99 wt. % of the composition, while the curable monomeric or polymeric component per se typically represents about 1 wt. % to 50 wt. %, preferably about 1 wt. % to 30 wt. %, of the curable polymeric composition.

Typical ceramic materials used in conjunction with the invention include: metal oxides such as $Al_2O_3$, $ZrO_2$, $TiO_2$, $ZnO$, $SiO_2$, $BaTiO_3$, $BaZrO_3$, $SrTiO_3$, $WO_2$, $WO_3$, $Fe_2O_3$, $Fe_3O_4$, $Ca_5(PO_4)OH$, $MnFe_2O_4$, $PbZr_{0.5}Ti_{0.5}O_3$, $BaFe_{12}O_{19}$, $CrO_2$, $Cr_2O_3$, $MoO_2$, and $MoO_3$; silicon-containing ceramics such as $SiC$, $Si_3N_4$, and $Si_2ON_2$; aluminum nitride; tungsten carbide; samarium cobalt ($SmCO_5$);neodymium iron boride (NdFeB); TiC; TiN; $MoSe_2$; $MoSe_3$; $MoS_2$; and $MoS_3$. Any ceramic material can be used, and the process of the invention is not in any way limited with regard to a specific ceramic material or materials. However, as certain ceramic materials can provide a specific function in a particular context, the context may dictate choice of material. That is, when the final ceramic microstructure is to be magnetic, a magnetic ceramic material such as MnFe2O4 is used; when a piezoelectric ceramic microstructure is desired, a piezoelectric ceramic material such as $PbZr_{0.5}Ti_{0.5}O_3$ or $BaFe_{12}O_{19}$ is used; and so on.

Any metallic material can be used, and the process of the invention is not in any way limited with regard to a specific metallic material or materials. However, as certain metallic materials can provide a specific function in a particular context, the context may dictate choice of material.

In addition to including ceramic and metal powders in curable compositions as described above, such powders can also be processed by using polymeric binders to shape the compressed powder. Binders useful in conjunction with the invention include, but are not limited to, wax- or oil-based binders such as Acrawax® C (Glyco); Advawax® 240, 275, 280, 290 (Carstab); Eramid® (Hexcel); Glucolube®YL (Glyco); Hostalub®FA 1 (American Hoechst); HSTA 1,3 (Hexcel); Interstab® G-8257; Kantstik® S powder (Specialty Products); Kemamide® W-20, W-40, E (Humko Chem.); Nopcowax® 22DS (Synthetic Products); Paricin®285, 220 (NL Industries); Ross Wax® 140 (Frank B. Ross); and Slip-Eze®, Slip-Quick®, and Vyn-Eze® (Hexcel) and the like; lower alkanols (C1-C6 alkanols, preferably C1-C4 alkanols) such as ethanol, isopropanol, and the like; and traditional dispersant/binder systems used in ceramic possessing, such as polymethacrylate/polyvinyl alcohol/polyethylene glycol systems. It will be appreciated by one of skill in the art, that the choice of binder is dependent upon the materials utilized to fabricate the part and on the intricacy of the cantilevered design.

The ceramic and metal nanoparticles may be obtained commercially (e.g., from TPL [Technologies to Products], Albuquerque, N. Mex.; Materials Modification, Inc., Fairfax, YA; Argonide Corporation, Sanford, Fla.; and Nanophase Technologies Corporation, Burr Bridge, Ill.) or fabricated using techniques known to those skilled in the art and/or described in the pertinent texts and literature (see, e.g., R. A. Andrievsky (1998), "State-of-the-Artand Perspectives in the Field of Particulate Nanostructured Materials," *J. Mater. Sci. Technol.* 14:97-103). Generally, the nanoparticles will be approximately 1 nm to approximately 1000 nm in diameter, preferably approximately 1 nm to approximately 500 nm in diameter, and most preferably approximately 1 nm to approximately 100 nm in diameter.

Figure 6A:
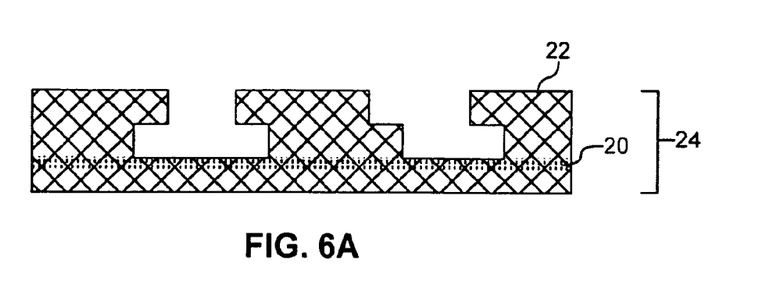
FIG. 6A schematically illustrates a compliant cantilevered micromold comprised of a cast mold and a perforated metal substrate bonded together.
Figure 6B:
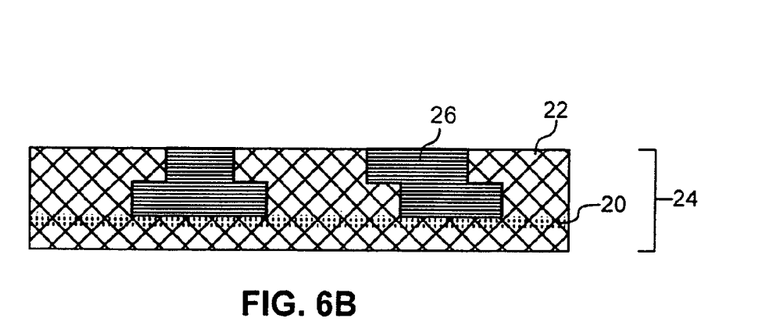
FIG. 6B schematically illustrates the compliant cantilevered micromold filled with electroplated metal.
Figure 6C:
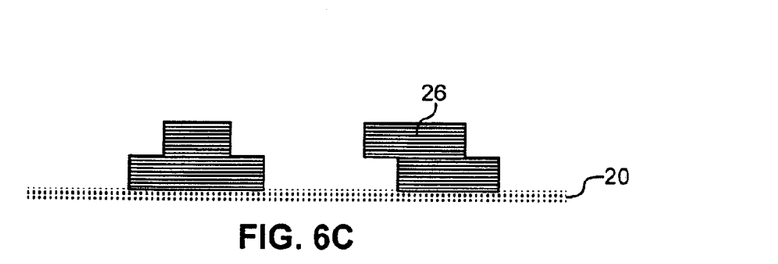
FIG. 6C schematically illustrates an electroplated microstructure comprised of the electroplated metal and attached to the porous metal substrate after the compliant cantilevered micromold is removed.
Figure 6D:
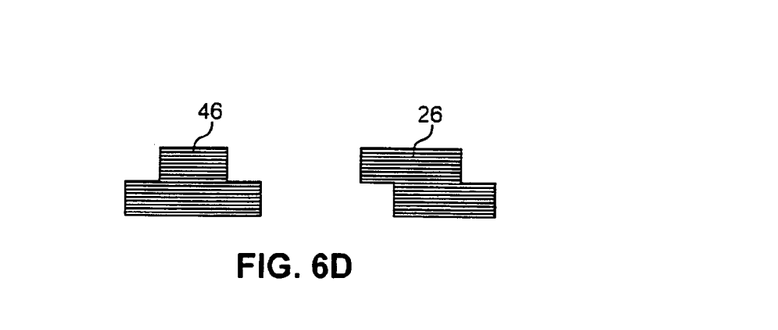
FIG. 6D schematically illustrates the freed electroplated micropart after the porous metal substrate is removed.
Figure 7:
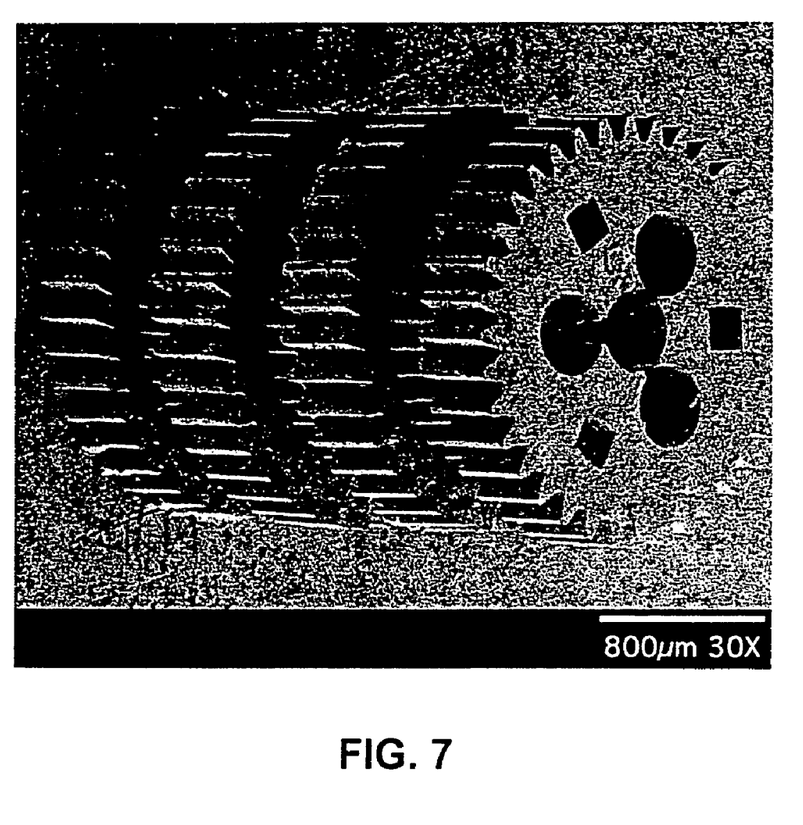
FIG. 7 is a SEM photograph of a cantilevered microstructure made according to the method described in Example 3.

If electroforming techniques are to be used to form the cantilevered micropart, an electroforming base is incorporated into the compliant cantilevered micromold. As shown in FIG. 6A, the formation of cantilevered microparts using an electroforming compliant cantilevered micromold begins with a cantilevered micromold 24 comprised of a mold 22 formed of a hardened or polymerized compliant polymeric material containing an electroforming base comprised of a porous metal substrate 20. The cantilevered micromold is filled with electroformed metal 26, as shown in FIG. 6B. Once the mold has been filled with the electroformed metal, any overplating may be removed and the compliant cantilevered micromold removed by dissolution or charring to release the electroformed metal 26 attached to the porous metal substrate 20, as shown in FIG. 6C. As noted above, various selective metal dissolution or overplating and lapping processes might be used to provide free metal parts or structures 46, as shown in FIG. 6D.

Suitable metals that can be used for electroplating include, but are not limited to, nickel, copper, silver, platinum, gold, nickel/iron, nickel/cobalt, nickel/tungsten, nickel/manganese, tin/lead, and other mixtures and alloys thereof.

An advantage of the cantilevered compliant micromolds of this invention is their ability to be removed by gentle flexing so as to loosen the cantilevered part therein. If desired, however, the micromold may be dissolved in appropriate solvents. These solvents vary in usefulness according to the nature of the compliant polymeric material employed and the material from which the cantilevered microstructure is made. Appropriate radiation, oxidative, thermal, or other treatments might be used to degrade the molecular structure of the mold material to enhance the solubility of the compliant mold or to directly remove the mold material. Such treatments might include UV exposure, x-ray exposure, or ashing.

The use of compliant micromolds for the replication of cantilevered structures and parts formed of plastic, sintered metal or ceramic powder, or electroformed metals and other materials provides significant savings of both time and money in the production of large volumes of microscale devices. Some of the potential uses of the invention include microscale chem/bio detectors, portable or miniaturized medical diagnostic equipment, high-pressure microfluidic connectors, DNA analysis equipment, optical switches and related equipment, inertial sensing devices, and other miniaturized devices.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles and practical applications of the invention in order to enable others skilled in the art to best use the invention in various embodiments and with various modifications suited to the particular use contemplated. The scope of the invention is to be defined by the following examples and claims.

All patents, patent applications, and publications mentioned herein are hereby incorporated by reference in their entireties.

EXPERIMENTAL

Example 1

Master Part Assembly

A cantilevered multilayer master part was made by gluing together LIGA fabricated gears. Two stacks of nickel LIGA gears were glued together using Prism 454 from Loctite Corp., Newington, Conn. One stack was composed of two large gears glued in a staggered manner so that a section of the upper gear was cantilevered over the lower gear. The second stack has a larger upper gear and a smaller lower gear. The two stacks were then glued to an aluminum sheet and surrounded by a metal collar. A representation of the two gear stacks is presented in as 10 in FIGS. 1A, 1B, 2A, 2B, 3A and 3B.

Example 2

Compliant Micromold Fabrication Using Poly(Dimethylsiloxane)(PDMS)

The cantilevered master fabricated in Example 1 was used to prepare a compliant mold. A compliant molding composition was prepared using GE Silicones RTV630 two part silicone rubber compound. The molding composition components were as follows

| RTV630A (part A) | 47.54 g |
| RTV630A (part B) | 5.3 g |

The components were thoroughly mixed, degassed, and poured over the cantilevered master. The mixture was highly viscous and time was allowed for air bubbles to rise to the surface. A light methanol spray was applied to relieve surface tension allowing the air bubbles to escape. The mold was first cured at room temperature overnight and then in the oven at 135° F. for three hours. The metal collar was then removed and the compliant mold removed from the master by flexing and gently extracting the cured PDMS. The gears remained glued to the aluminum sheet and were not damaged.

Example 3

Cantilevered Micropart Manufacture

The PDMS mold prepared in Example 2 was used to fabricate a replicate of the original cantilevered gear master using a polyurethane molding composition, TDT-178-85 sold by Vantico. The molding composition components were as follows:

| | |
|---|---|
| TDT-178-85 (part A) | 25 g |
| TDT-178-85 (part B) | 25 g |

The components were thoroughly mixed and degassed. The compliant cantilevered micromold was sprayed with a silicon mold release and tape was wrapped around the top of the mold to act as a mold collar and to contain excess polyurethane. The molding composition was poured into the cantilevered micromold and degassed again so that the molding composition completely filled the cantilevered mold. The filled mold was allowed to cure over night at room temperature and was then cured for an additional 4 hours at 135° F. The tape collar was then removed and the cured polyurethane removed by flexing the compliant micromold. Microscopic examination of the polyurethane micropart showed that all critical features of the cantilevered gears were successfully replicated. This procedure was successfully repeated for stacks of 3, 5, and 7 gears.

Example 4

Cantilevered Ceramic Micropart Manufacture

LIGA gears were stacked and glued together using a Loctite adhesive to form a master as in Example 1 and silicone rubber was used to form the compliant mold as in Example 2.

The molding composition was provided by first dispersing a ceramic powder (4 gm Tosoh yttria stabilized zirconia, with an average diameter of 200 micrometers) in approximately 20 mL methyl ethyl ketone (MEK) using a dispersant (0.06 gm Disperbyk-180, Byk-Chemie, Wallingford, Conn.) and an ultrasonic horn. An epoxy resin (Shell 815) was then added (1 g per 4 g of powder) and the MEK was removed by evaporation, thus producing a homogeneous mixture of the ceramic powder and the resin. Next a curing agent, triethylenetetramine (TETA), was added, (0.125 mL per g of resin) and mixed in using a mortar and pestle until the mixture resembled putty. The mixture was then pressed into the compliant cantilevered micromold and allowed to cure. The cured sample was pulled out of the compliant micromold taking care not to break it. The sample was placed in a furnace, heated in air to 450° C., and held at temperature for one hour to burn off the epoxy binder. The sample was then heated to 1350° C. and held at that temperature for 3 hours.

We claim:

1. A method for fabricating a compliant cantilevered micromold having an electroplatable backing comprised of a porous metal material, the method comprising the steps of:
   a) infusing a compliant polymeric material through a porous metal material into a tooled master part having cantilevered features therein so as to conform the compliant polymeric material to the cantilevered features;
   b) hardening or polymerizing the infused compliant polymeric material; and
   c) separating the tooled master part from the porous metal substrate and the hardened or polymerized compliant polymeric material to provide a compliant cantilevered micromold having an electrically conducting backing.

2. The method of claim 1, wherein said compliant polymeric material is capable of being cast or injection-molded.

3. The method of claim 1, wherein said compliant polymeric material contains at least one filler.

4. The method of claim 2, wherein the compliant polymeric material is selected from the group consisting of polysiloxanes, polyalkylenes, and polyurethanes, and derivatives and copolymers thereof.

5. The method of claim 4, wherein the compliant polymeric material is a polysiloxane.

6. The method of claim 5, wherein said compliant polymeric material comprises poly(dimethylsiloxane).

7. The method of claim 1, wherein more than one porous metal material is infused with the compliant polymeric material.

* * * * *